United States Patent [19]

Takahashi et al.

[11] Patent Number: 5,753,275
[45] Date of Patent: May 19, 1998

[54] CAVITY PLATES ALIGNING AND GUIDING APPARATUS IN DISK INJECTION MOLDING DIES

[75] Inventors: Mitsuo Takahashi, Matsudo; Katsuyuki Yasuda, Funabashi, both of Japan

[73] Assignee: Seikoh Giken Co., Ltd., Matsudo, Japan

[21] Appl. No.: 685,747

[22] Filed: Jul. 24, 1996

[30] Foreign Application Priority Data

Nov. 17, 1995  [JP]  Japan .................... 7-323932

[51] Int. Cl.$^6$ ............................................. B29C 45/26
[52] U.S. Cl. ............... 425/186; 425/192 R; 425/595; 425/810; 264/107
[58] Field of Search ............... 425/186, 192 R, 425/542, 810, 556, 190, 595; 264/107

[56] References Cited

U.S. PATENT DOCUMENTS

| | | | |
|---|---|---|---|
| 3,989,436 | 11/1976 | McNeely et al. | 425/810 |
| 4,340,353 | 7/1982 | Mayer | 425/810 |
| 4,527,971 | 7/1985 | Strausfeld et al. | 425/409 |
| 4,681,527 | 7/1987 | Amory et al. | 264/107 |
| 4,707,321 | 11/1987 | Segawa et al. | 425/810 |
| 4,772,196 | 9/1988 | Asai | 425/810 |
| 4,979,891 | 12/1990 | Kitamura | 264/107 |
| 5,388,982 | 2/1995 | Takahashi et al. | 425/57 |
| 5,429,488 | 7/1995 | Neu | 425/186 |
| 5,464,339 | 11/1995 | Arakawa et al. | 425/186 |

FOREIGN PATENT DOCUMENTS

| | | |
|---|---|---|
| 0 714 746 | 6/1996 | European Pat. Off. . |
| 0 715 939 | 6/1996 | European Pat. Off. . |
| 62-051413 | 3/1987 | Japan . |

Primary Examiner—Khanh P. Nguyen
Attorney, Agent, or Firm—Spencer & Frank

[57] ABSTRACT

An apparatus for guiding and aligning fixed side and movable side disk cavity plates of disk injection molding dies of an injection molding device is provided with a plurality of first grooves formed on the outer surface of the fixed side disk cavity plate and a plurality of second grooves formed on the outer surface of the movable side disk cavity plate, wherein each of the first grooves and second grooves form a pair of aligned grooves parallel to the center axes of the fixed and movable side disk cavity plates. The apparatus further comprises a plurality of guide blocks fixed to one groove of a pair of aligned grooves and engaged with the other groove of the pair. The apparatus includes a self-aligning aspect for holding the movable side disk cavity plate in intimate contact with the movable side mounting plate along a plane perpendicular to the center axes of the movable side disk cavity plate and the fixed side disk cavity plate and for slidably supporting the movable side disk cavity plate, such that the center axis of the movable side disk cavity plate is caused to align with the center axis of the fixed side disk cavity plate.

6 Claims, 4 Drawing Sheets

CAVITY PLATES ALIGNING AND GUIDING APPARATUS IN DISK INJECTION MOLDING DIES

BACKGROUND OF THE INVENTION

1. Field of the Invention

The present invention relates to a fixed side and movable side disk cavity plates aligning and guiding apparatus in injection molding dies used in the injection molding of optical disks, and the like.

2. Description of the Related Art

In conventional optical disk injection molding dies, bits transferred onto the surface of a molded optical disk substrate may be dislocated or deformed by the dislocation of the axial centers of the fixed side and movable side disk cavity metal dies. This dislocation of the axial centers occurs; when the dies are opened after the completion of injection molding. There are several proposals for arrangements by which the dislocation of the axial centers of the disk cavity metal dies can be prevented. However, there are problems with some of the proposals in that the metal dies are worn or, in an extreme case, the dies are broken by the vertical deflection error of a movable side platen guide rod of an injection molding machine when the dies are opened and closed.

FIG. 4 and FIG. 5 are views explaining the above problem of a conventional metal die apparatus and FIG. 5 is a cross sectional view of the conventional optical disk substrate injection molding metal dies. The conventional metal die apparatus employs a pair of guide rings composed of cylindrical members coaxially positioned in contact with the outside diameters of the metal dies as an aligning and guiding means for the disk cavity plates disposed at the center of the fixed side and movable side metal dies. The cylindrical members have male and female engaging surfaces at the respective extreme ends thereof.

A fixed side disk cavity plate 2 is secured to a fixed side mounting plate 1. A spool bush 3 for injecting a molten resin material is disposed at the center of the fixed side disk cavity plate 2 and the fixed side mounting plate 1. The fixed side mounting plate 1 has a fixed side cylindrical guide ring 4 secured thereto. A female tapered surface 5, having an inclining angle of 3°–5°, is formed on the inner periphery of the end surface of the fixed side cylindrical guide ring 4. A stamper plate 6 is secured to the surface of the fixed side disk cavity plate 2 by a stamper plate mounting member 7. A fixed side metal die assembly 100 is arranged as described above.

A movable side mounting plate 8 has a movable side disk cavity plate 9 fixed thereto and a movable side cylindrical guide ring 12 fixed to the outer periphery of the movable side disk cavity plate 9. The movable side cylindrical guide ring 12 has a male tapered surface 13 formed on the outer periphery of the extreme end thereof. The male tapered surface 13 is precisely engaged with the female tapered surface 5. A punch 10 is disposed at the center thereof to punch the center hole of a molded optical disk substrate 11. A movable side metal die assembly 200 is arranged as described above.

The aforesaid respective metal dies are mounted to a fixed side platen 14 and a movable side platen 15 of an injection molding machine. A spring 16 is a spring for returning the punch 10. A molten resin material is ejected under high pressure from the spool bush 3 into a cavity formed by the respective disk cavity plates 2 and 9 when the dies are closed as shown in FIG. 5.

Fine signal patterns of the stamper plate 6 are transferred onto a surface of the molded optical disk substrate 11. After the optical disk substrate 11 is molded, the dies are opened by continuously retracting the movable side platen 15 and the molded optical disk substrate 11 is taken out from the metal dies. Although the conventional optical disk substrate injection molding metal dies widely employ the tapered surface guide system shown in FIG. 5 as a means for aligning the axial centers of the fixed side metal die 100 and the movable side metal die 200, the above system has the following defects.

(1) As shown in FIG. 4, in the optical disk substrate injection molding machine of such a type as to execute molding by horizontally moving the movable side platen 15, the movable side platen 15 is driven by a not shown toggle mechanism, a hydraulic piston or the like while being held by four guide rods 17. In this case, the guide rods 17 are deflected downward by an amount δ by the intervals between the bearing 18 of the movable side platen 15 and the guide rods 17 and the weight of the movable side platen 15 and the movable side metal die 200. Therefore, when the dies are closed, the axial center of the movable side metal die 200 which was in coincidence with the axial center of the fixed side metal die 100 through the above tapered guide mechanism, is gradually deflected from the axial center of the fixed side metal die 100 during the die opening process and displaced downward by an amount of deflected displacement δ. In general, the amount of deflected displacement δ may reach 50–70 μm or more in an actually measured value.

When an optical disk substrate is molded at high speed, the interior of the molded optical disk substrate 11 is in a partially melted state and the dies are opened when the surface of the substrate is not yet solidified. Thus, the dislocation of the axial centers of the fixed side metal die 100 and the movable side metal die 200 must be kept to zero until a distance between the opened dies reaches at least 200 μm to prevent the occurrence of such disadvantages that fine signal bits transferred onto the molded optical disk substrate 11 are deformed and the fine signal bits are transferred onto it twice. However, when the taper angle of the guide rings 4 and 12 is set to 5°, the amount of dislocation of the axial centers of the fixed side metal die 100 and the movable side metal die 200 which is caused by the amount of deflected dislocation δ, reaches 17.5 μm when the dies are opened 200 μm. Consequently, the molded optical disk substrate 11 is deformed by being subjected to a vertical stress corresponding to the amount of deflected dislocation of 17.5 μm.

(2) Since the impact of the total weight of the movable side platen 15 and the movable side metal die 200 and the inertia force thereof are applied to the tapered surfaces 5 and 13 of the respective guide rings 4 and 12 in each molding cycle in the process of closing the dies, the tapered surfaces 5 and 13 are likely to be abnormally worn or seized. At the same time, there is a possibility that harmful worn metal powder will also scatter.

(3) The tapered surfaces 5 and 13 must be periodically repaired by being machined because they are abnormally worn and seized as described above. Since the tapered surfaces 5 and 13 must be machined with pinpoint accuracy, and such repair of the tapered surfaces is accompanied by the height adjustment machining of the disk cavity plates and other parts, a high maintenance cost and a long period for maintenance are needed.

An object of the present invention is to provide a fixed side and movable side disk cavity plates aligning and guiding apparatus in disk injection molding dies capable of solving the aforesaid problems.

SUMMARY OF THE INVENTION

A fixed side and movable side disk cavity plates aligning and guiding apparatus for disk injection molding dies of the present invention for achieving the above object includes a fixed side disk cavity plate and a movable side disk cavity plate for forming a cavity space comprising a plurality of pairs of parallel grooves formed to the same cross sectional shape. The parallel grooves have groove surfaces which coincide with the common outside diameter surface of the fixed side disk cavity plate and the movable side disk cavity plate in parallel with the center line of the dies when they form the cavity space. The apparatus also includes guide blocks, each fixed to one of each of which is pair of parallel grooves, and precisely engaged with the other pairs of parallel groove. In addition, the apparatus comprises a self-aligning means for holding the disk cavity plate of the movable side metal die on a plane in intimate contact under pressure with a movable side mounting plate, as well as slidably supporting the disk cavity plate of the movable side metal die. The plane is perpendicular to the axis of the disk cavity plate of the movable side metal die.

The self-aligning means can be composed of spring means for causing the disk cavity plate of the movable side metal die to come into contact with the movable side mounting plate under pressure and a guide means for guiding the disk cavity plate of the movable side metal die so that the axis of the disk cavity plate can move within a certain range.

A cemented carbide material can be used on the surfaces of the parallel grooves which are engaged with the surfaces of the guide blocks, as well as on the surfaces of the guide blocks A coupling guide shape can be formed at the extreme end of each of the guide blocks.

DESCRIPTION OF PREFERRED EMBODIMENTS

An embodiment of a fixed side and movable side disk cavity plates aligning and guiding apparatus in injection molding dies according to the present invention will be described in detail below with reference to the drawings.

Figure 1:
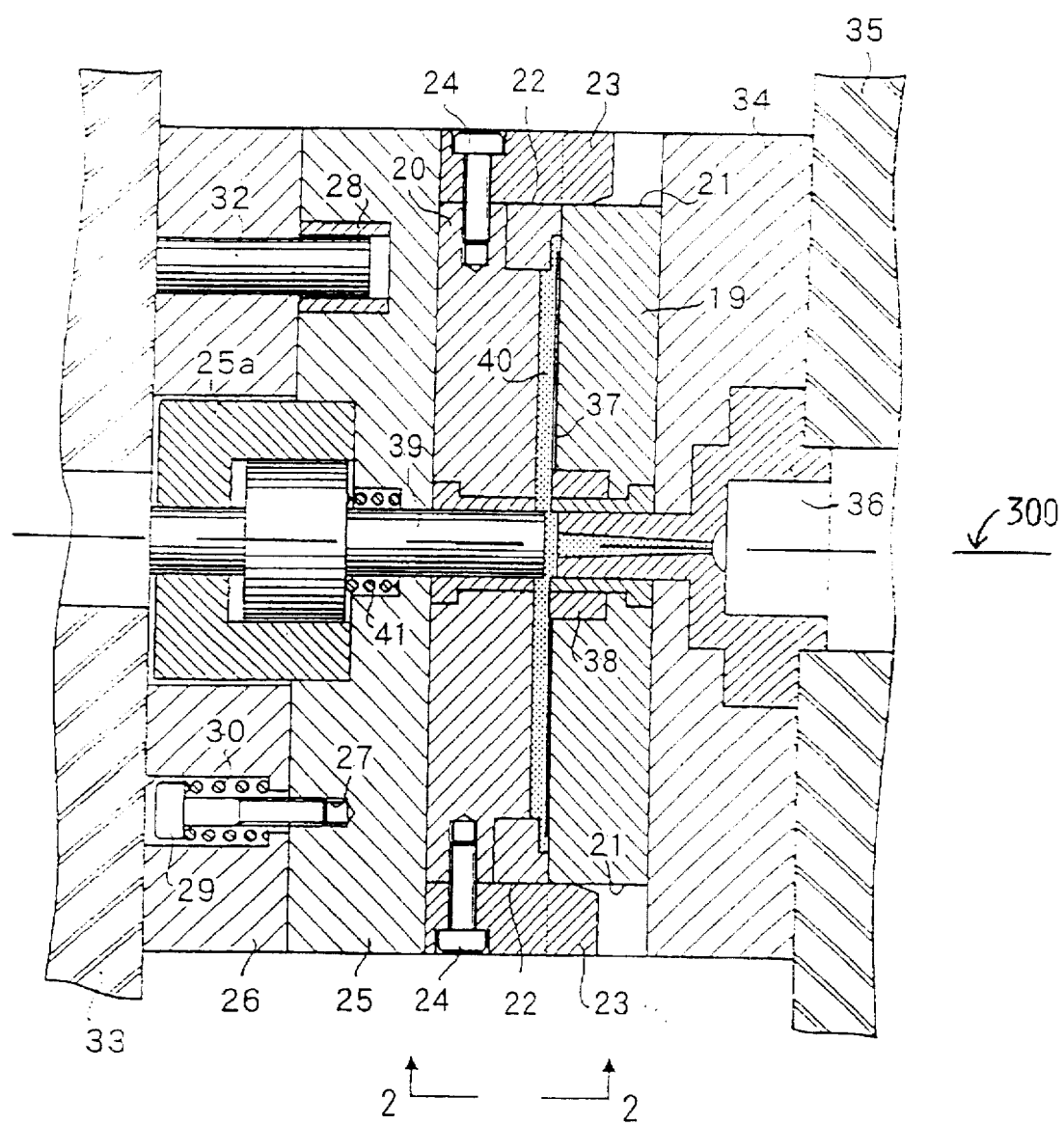
FIG. 1 is a cross sectional view of optical disk injection molding metal dies using an embodiment of a fixed side disk and movable side cavity plates aligning and guiding apparatus in disk injection molding dies according to the present invention.

FIG. 1 is a cross sectional view of optical disk injection molding metal dies using an embodiment of a fixed side disk and movable side cavity plates aligning and guiding apparatus in injection molding dies according to the present invention.

Figure 2:
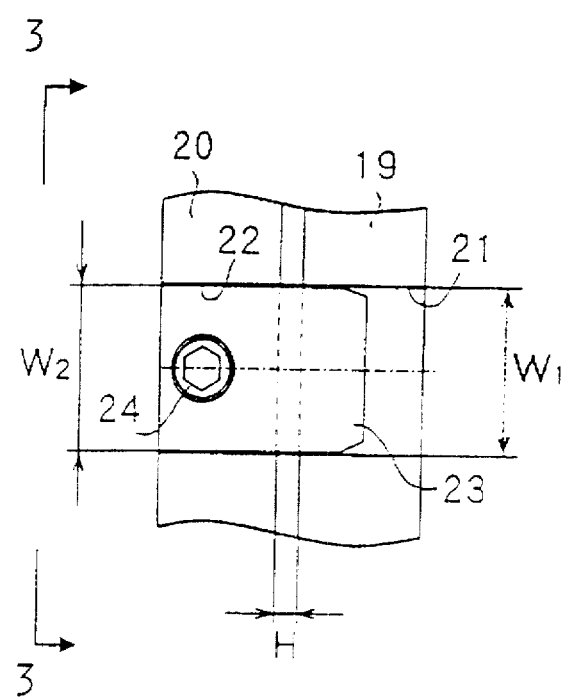
FIG. 2 is a view of the optical disk injection molding dies taken along the line 2—2 of FIG. 1.
Figure 3:
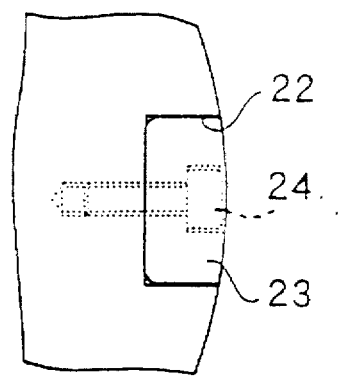
FIG. 3 is a view of the optical disk injection molding dies taken along the line 3—3 of FIG. 2.

FIG. 2 is a view taken along the line 2—2 of FIG. 1 and FIG. 3 is a view taken along the line 3—3 of FIG. 2.

A fixed side disk cavity plate 19 is secured to a fixed side mounting plate 34 and a spool bush 36 is disposed at the center thereof. A movable side disk cavity plate 20 is secured to a movable side mounting plate 25. The fixed side disk cavity plate 19 and the movable side disk cavity plate 20 are simultaneously machined to form key ways thereto before they are mounted. The fixed side disk cavity plate 19 is caused to confront the movable side disk cavity plate 20 in intimate contact therewith and they are machined to the same diameter, and fixed side parallel grooves 21 and movable side parallel grooves 22, each having a width $W_1$, are precisely ground at the same time at four positions perpendicular to each other on the respective outside diameter surfaces of the cavity plates 19 and 20.

A guide block 23 is secured to each of the parallel grooves 22 of the movable side disk cavity plate 20.

The guide block 23 is a block made of a cemented carbide material having a hardness of $H_RA$ 83–89 and a transverse strength of 200 kgf/mm². The guide block 23 has a width $W_2$ and a height H and is secured by a fixing bolt 24.

However, the width $W_2$ of the guide block 23 is preferably determined as follows.

$$W_2 = W_1 - 0.003 \text{ (mm)}$$

In the embodiment, $W_1$=40.000 mm, $W_2$=39.997 mm, H=5 mm are used as a design criterion.

As shown in FIG. 1 and FIG. 2, the extreme end of the guide block 23 is chamfered and formed to a coupling guide shape.

The movable side disk cavity plate 20 of the above movable side metal die is supported by a self-aligning means and arranged such that when it is coupled with the fixed side disk cavity plate 19, the center 300 of the movable side disk cavity plate 20 of the movable side metal die is caused to automatically coincide with the center 300 of the fixed side disk cavity plate 19.

The self-aligning means is composed of a plurality of sets of springs 30 for causing the movable side disk cavity plate 20 of the movable side metal die to come into intimate contact with the movable side mounting plate under pressure and a plurality of sets of guide means 28 and 32 for guiding the movable side disk cavity plate 20 of the movable side metal die so that its shaft can move within a certain range. The movable side mounting plate is formed by being divided into a portion 25 and a portion 26. Screw holes 27 for bolts and guide bushes 28 are disposed at six positions on the mounting plate 25 to which the movable side disk cavity plate 20 is mounted, respectively.

The mounting plate 26 has bolts 29 and counter sunk holes for the compressed coil springs 30, in the same number as the screw holes 27, and guide rods 32, each having a diameter for enabling the rods 32 to be engaged with the holes of the above guide bushes 28 within an interval of 0.3 mm in diameter. The compressed coil springs 30, in the same number as the bolts 29, are inserted and the mounting plate 25 is attached to the mounting plate 26 by the bolts 29.

With this arrangement, the movable side disk cavity plate 20 of the movable side metal die secured to the movable side mounting plate 25 can slide on a surface within the range of a diameter of 0.3 mm in an intimate contact state achieved by the pressure of the compressed coil springs 30. Note, the mounting plate 26 is secured by being mounted to a movable side platen 33. The fixed side mounting plate 34 is secured by mounted to a fixed side platen 35.

A stamper plate 37 is secured to the fixed side disk cavity plate 19 by a stamper plate mounting bush 38. A punch 39 for punching the center hole of a molded optical disk substrate 40 is guided by the portion 25a of the movable side mounting plate 25 so that it can advance and retract. A sufficient idle portion is defined between the portion 25a of the movable side mounting plate 25 and the movable side mounting plate 26. Then, the punch 39 is urged in a return direction by a return spring 41.

The optical disk substrate injection molding metal dies of the present invention arranged as described above has the following advantages.

(1) The axial center 300 of the fixed side metal die is aligned with the axial center 300 of the movable side metal die in such a manner that the parallel surfaces of a plurality of pairs of guide blocks 23 disposed on the outer periphery of the movable side disk cavity plate 20 are precisely engaged with the sides of the fixed side parallel grooves 21 disposed on the outer periphery of the fixed side disk cavity plate 19. Therefore, when the dies are opened after the completion of injection molding, the projecting parallel surfaces of the guide blocks 23 are removed from the surfaces of the fixed side parallel grooves 21 of the fixed side disk cavity plate 19 at the time when the movable side platen 33 retracts by 5 mm. Thus, a vertical deforming stress, which would be caused by the conventional tapered guide surface alignment system, does not act on the molded optical disk substrate 40 at all during the above operation.

Figure 4:
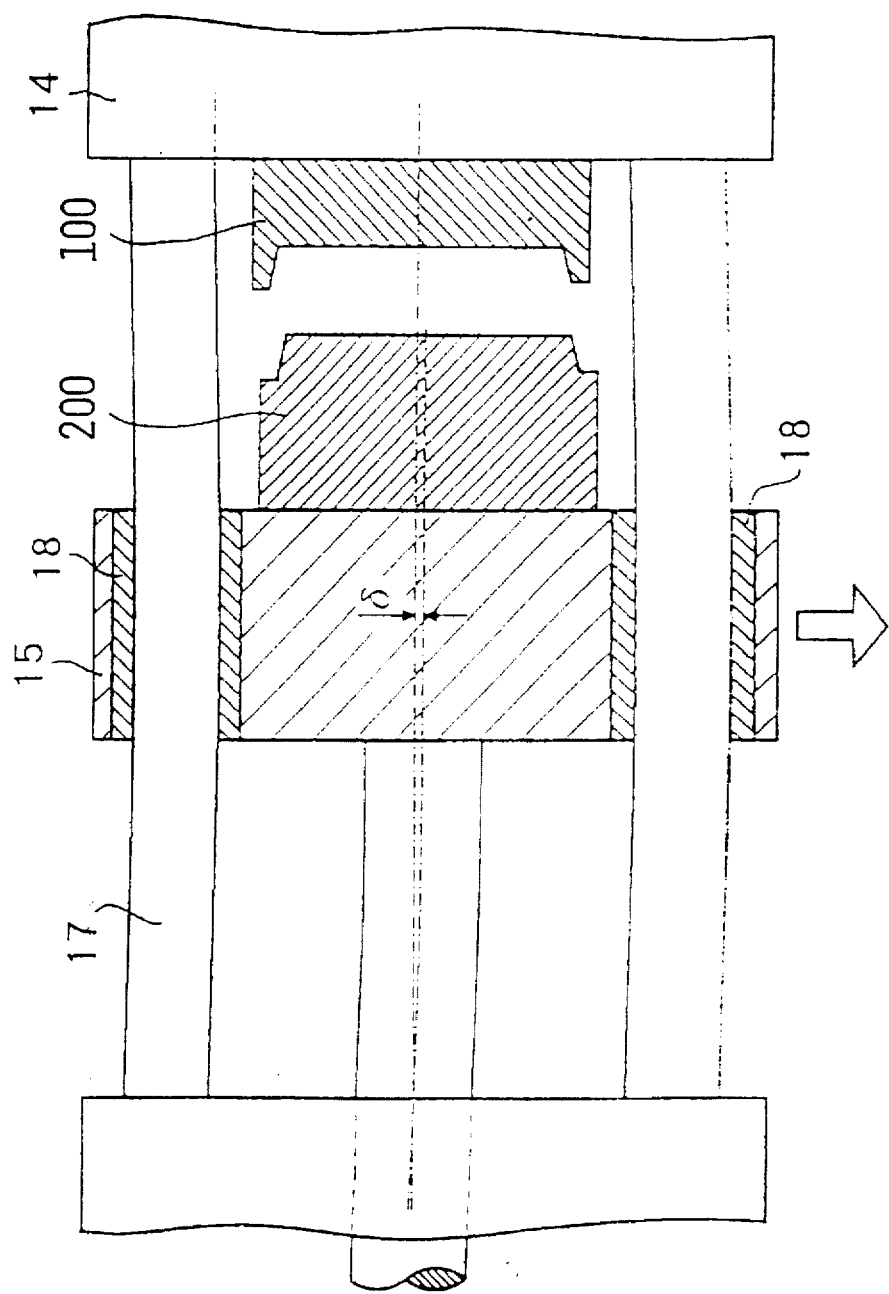
FIG. 4 is a schematic view explaining problems of conventional optical disk injection molding metal dies.
Figure 5:
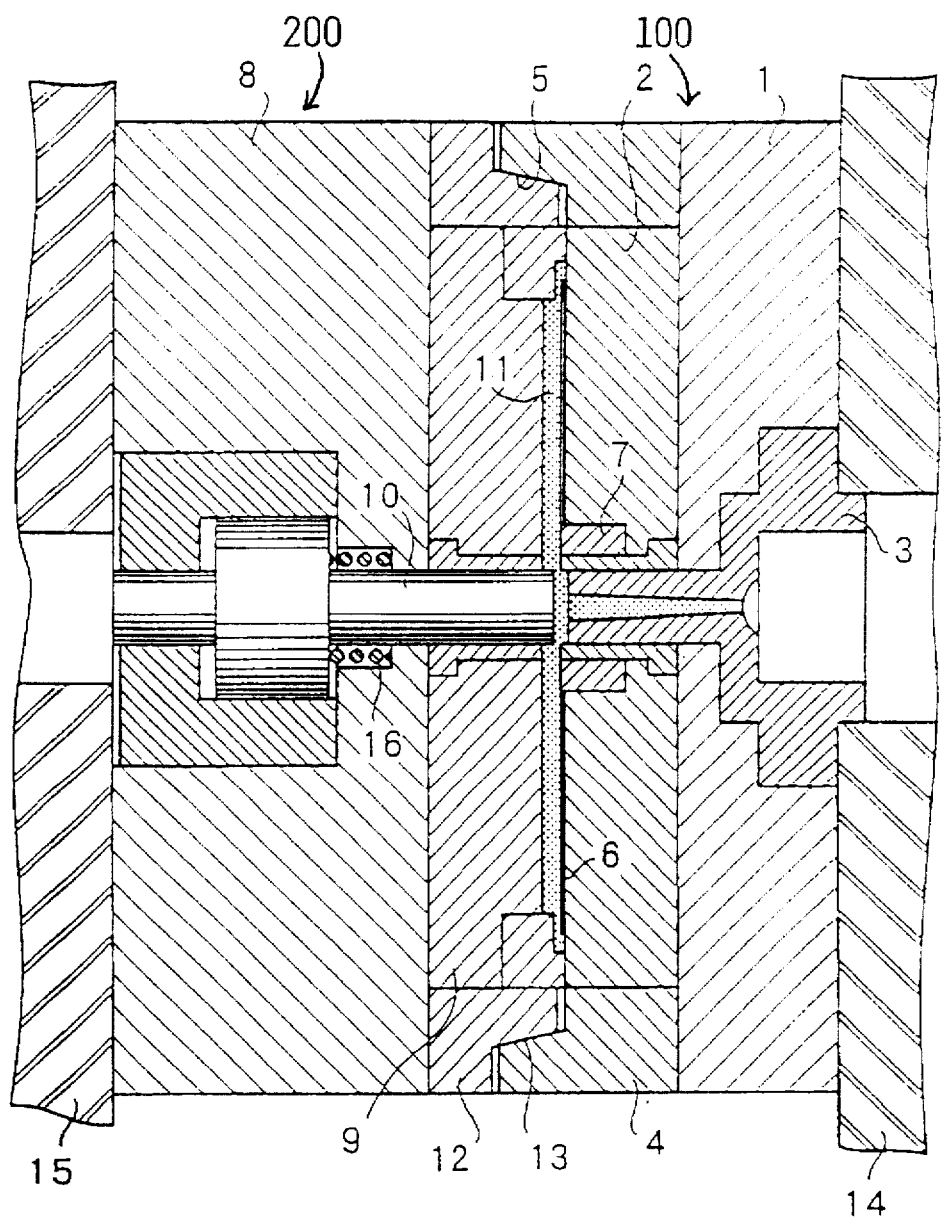
FIG. 5 is a detailed cross sectional view of the conventional optical disk injection molding metal dies shown in FIG. 4.

(2) The movable side mounting plate 25 on which the movable side disk cavity plate 20 is mounted as described in FIG. 1 is disposed so that it can move with respect to the movable side platen 33. Thid is different from the prior art structure shown in FIG. 4 and FIG. 5 in which the movable side disk cavity plate is secured to the movable side platen as an integral part thereof. Consequently, when the dies are closed and opened, the weight and inertial force of the movable side platen 33 caused by the deflection of the guide rods of an injection molding machine are not applied between the parallel grooves 21 and the guide blocks 23 which form the alignment and guide surfaces of the respective fixed side and movable side disk cavity plates 19 and 20. At the same time, the parallel surfaces of the projections of the guide blocks 23 of the movable side disk cavity plate 20 are aligned by themselves and engaged with the guide surfaces of the parallel grooves 21 of the fixed side cavity plate 19. Since applied to the respective guide surfaces 21 and 23 in this case is only the light weight of 20–30 kgf from the movable side disk cavity plate 20, the mounting plate 25 and the like, the damage of the above parallel alignment and guide surfaces 21 and 23 can be greatly reduced.

(3) Since simple parallel surfaces are used as the alignment and guide surfaces of the respective fixed side and movable side disk cavity plates, which is different from the conventional tapered guide surface alignment system, the guide surfaces can be simply repaired by replacing the guide blocks whose cost is lower than the cost of repairing the aforesaid prior art tapered guide surfaces and machining the parallel guide grooves to increase the widths thereof.

Note, the alignment and guide means of the fixed side and movable side disk cavity plates 19 and 20 based on the present invention may be provided with a cylindrical ring which is engaged with the same axial center of the outside diameter surfaces of the fixed side and movable side disk cavity plates 19 and 20 depending upon the structure of the metal dies.

Although the surfaces of the aforesaid guide blocks 23 are made of cemented carbide material as an example, the cemented carbide material may be used on the surfaces of the parallel grooves 21 and 22 to be engaged with the above guide blocks 23.

As described above in detail, the metal die apparatus using the fixed side and movable side disk cavity plates aligning and guiding apparatus in the disk injection molding metal dies according to the present invention prevents the dislocation of the axial centers 300 in a vertical direction of the fixed side metal die and the movable side metal die which is caused when the metal dies are opened after the completion of injection molding, so that the dislocation of fine signal bits transferred to a molded optical disk substrate and the quality deterioration of the molded substrate due to the signal bits being transferred twice can be prevented. Since the application of excessive loads such as the weight, inertia force and the like of the movable side platen caused by the deflection error of the injection molding machine is prevented, the damage of the metal dies can be greatly reduced. Therefore, the maintenance cost and the maintenance period can be greatly reduced as compared with the optical disk substrate injection molding metal dies employing the tapered guide surface system.

What is claimed is:

1. An apparatus for guiding and aligning fixed side and movable side disk cavity plates of disk injection molding dies of an injection molding device, each of the disk cavity plates having an outer surface and a center axis, and the movable side disk cavity plate being secured to a movable side mounting plate, said aligning and guiding apparatus, comprising:

a plurality of first grooves formed on the outer surface of the fixed side disk cavity plate;

a plurality of second grooves formed on the outer surface of the movable side disk cavity plate, each of said first grooves and each of said second grooves forming a pair of aligned grooves parallel to the center axes of the fixed side disk cavity plate and the movable side disk cavity plate;

a plurality of guide blocks, each of said guide blocks having a first end and a second end, and each of said guide blocks being fixed at the first end to one groove of a pair of aligned grooves and engaged at the second end with the other groove of said pair of aligned grooves; and a self-aligning means for holding the movable side disk cavity plate in intimate contact with the movable side mounting plate along a plane perpendicular to the center axes of the movable side disk cavity plate and the fixed side disk cavity plate, said self-aligning means slidably supporting the movable side disk cavity plate, whereby the center axis of the movable side disk cavity plate is aligned with the center axis of the fixed side disk cavity plate.

2. The aligning and guiding apparatus according to claim 1, wherein said self-aligning means is composed of spring means for causing the movable side disk cavity plate to come into intimate contact with the movable side mounting plate under pressure and of guide means for guiding the movable side disk cavity plate such that the center axis of the movable side disk cavity plate can move within a certain range.

3. The aligning and guiding apparatus according to claim 1, wherein cemented carbide material is used on the areas of said first and second grooves in contact with said guide blocks.

4. The aligning and guiding apparatus according to claim 1, wherein said guide blocks are made of cemented carbide material.

5. The aligning and guiding apparatus according to claim 1, wherein said guide blocks are fixed to said second grooves.

6. The aligning and guiding apparatus according to claim 1, wherein a coupling guide shape is formed at the second end of each of said guide blocks.

* * * * *